Dec. 16, 1930.  L. BERNER ET AL  1,785,176
INTERNAL COMBUSTION ENGINE
Filed May 14, 1928  4 Sheets-Sheet 1

Leo Berner
Paul Lohr
INVENTORS.

BY  Louis O. French
ATTORNEY

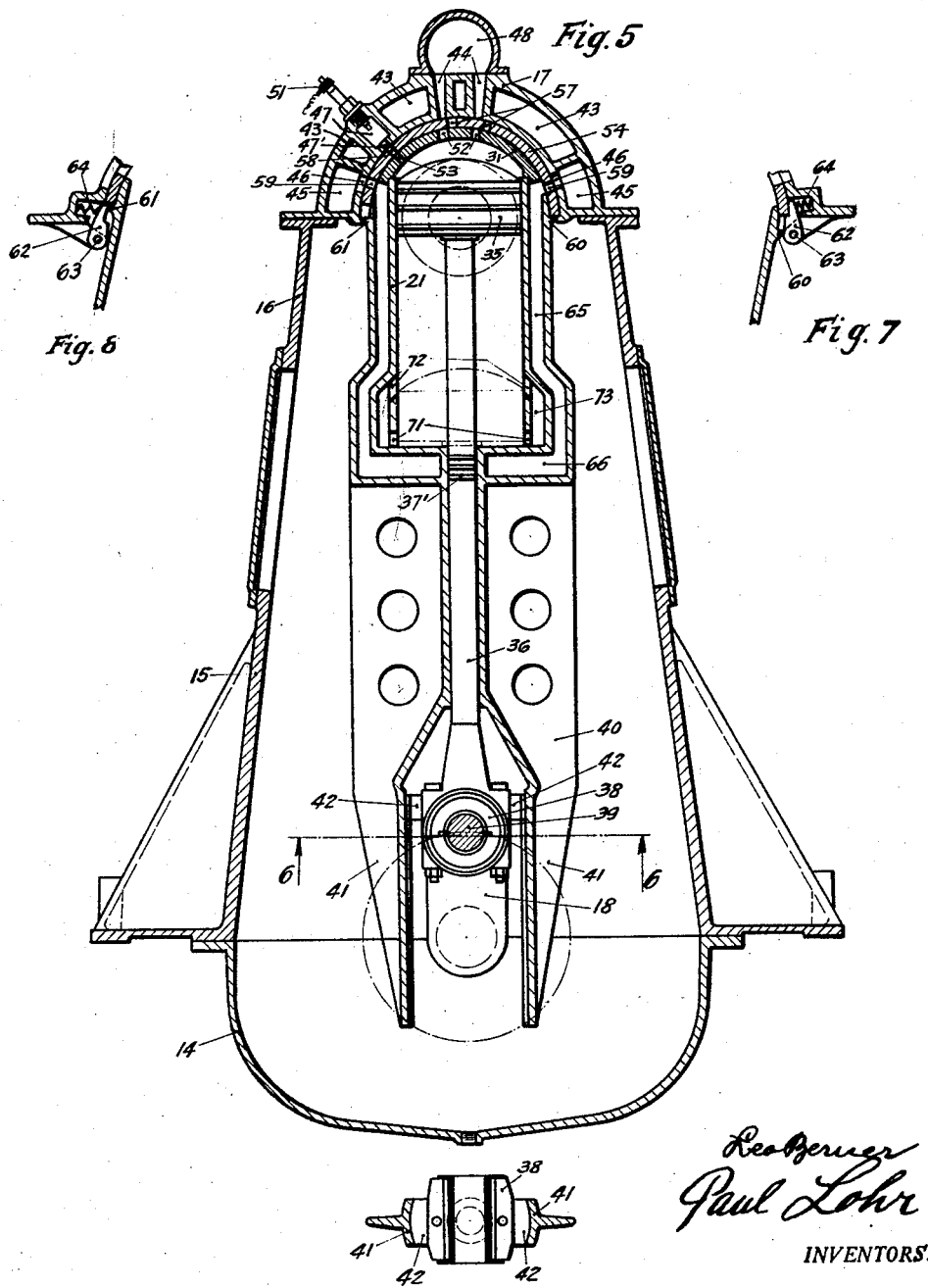

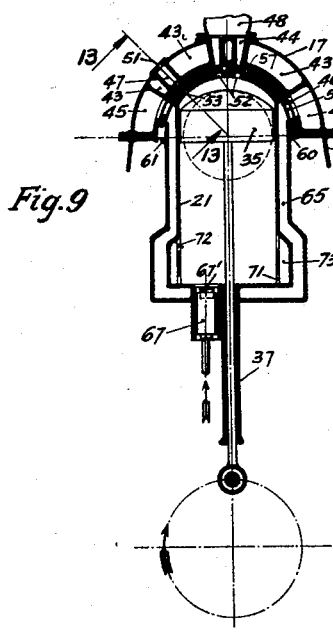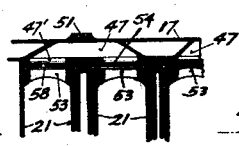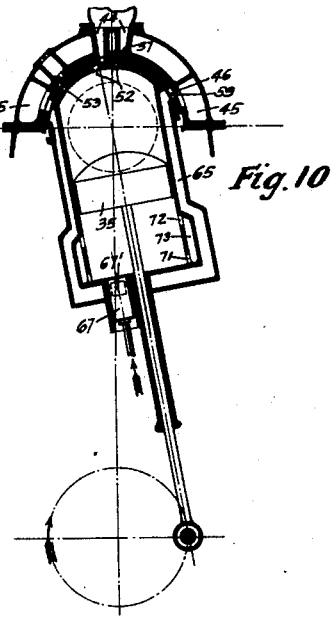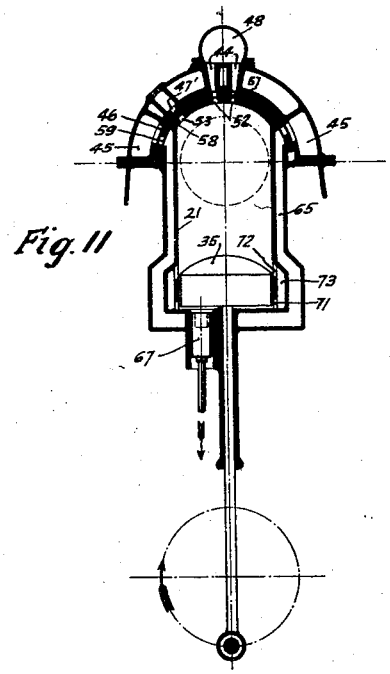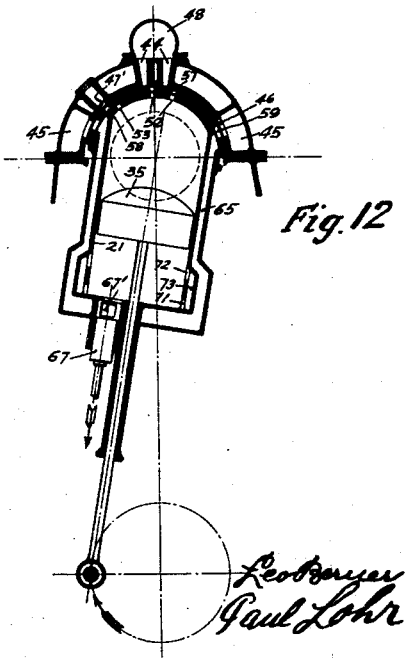

Patented Dec. 16, 1930

1,785,176

UNITED STATES PATENT OFFICE

LEO BERNER, OF SOUTH MILWAUKEE, AND PAUL LOHR, OF MILWAUKEE, WISCONSIN

INTERNAL-COMBUSTION ENGINE

Application filed May 14, 1928. Serial No. 277,582.

The invention relates to internal combustion engines.

One of the objects of the invention is to provide an internal combustion engine, preferably of the two cycle type, in which the cylinder is mounted for oscillatory movement and acts to control one of the valves, preferably the exhaust valve.

Another object of the invention is to provide an internal combustion engine in which a certain amount of residual gases are left in the cylinder at the end of the exhaust stroke and the fresh charge mixture is introduced into the cylinder at high pressure compared to the scavenging pressures usually used on two cycle engines, whereby the combustion process will be improved.

A further object of the invention is to provide a two cycle engine in which the fresh charge is compressed at the back of the piston and a special port arrangement controlled by the piston is used to control the flow of the fresh charge to the cylinder, the exhaust taking place at the top of the cylinder.

A further object of the invention is to provide a two cycle internal combustion engine in which the fresh charge is compressed in a chamber at the back of the piston, its entrance thereto being controlled by a piston valve driven in a novel manner from the crank shaft of the engine.

A further object of the invention is to provide an internal combustion engine in which the fresh charge is heated by the heat given off by the walls of the cylinder.

A further object of the invention is to provide a novel form of valve mechanism associated with the oscillatory engine cylinder and operated thereby to control the flow of exhaust gases from the cylinder and the automatic ignition of the charge.

A further object of the invention is to provide an internal combustion engine in which the cylinder is oscillated during movement of the piston, with means for transmitting the thrust from the piston to an extension of the cylinder associated with the crank shaft.

The invention further consists in the several features hereinafter set forth and more particularly defined by claims at the conclusion hereof.

In the drawings Fig. 1 is a side elevation view of an engine embodying the invention;

Fig. 5 is a detail sectional view taken on the line 5—5 of Fig. 3;

Fig. 6 is a detail sectional view taken on the line 6—6 of Fig. 5;

Figs. 7 and 8 are detail sectional views of the releasable, valve-holding means in different positions;

Figs. 9, 10, 11 and 12 are diagrammatic views showing the position of the engine parts at different times in the cycle of operation;

Fig. 13 is a detail view taken on the line 13—13 of Fig. 9.

Figures 1, 2:
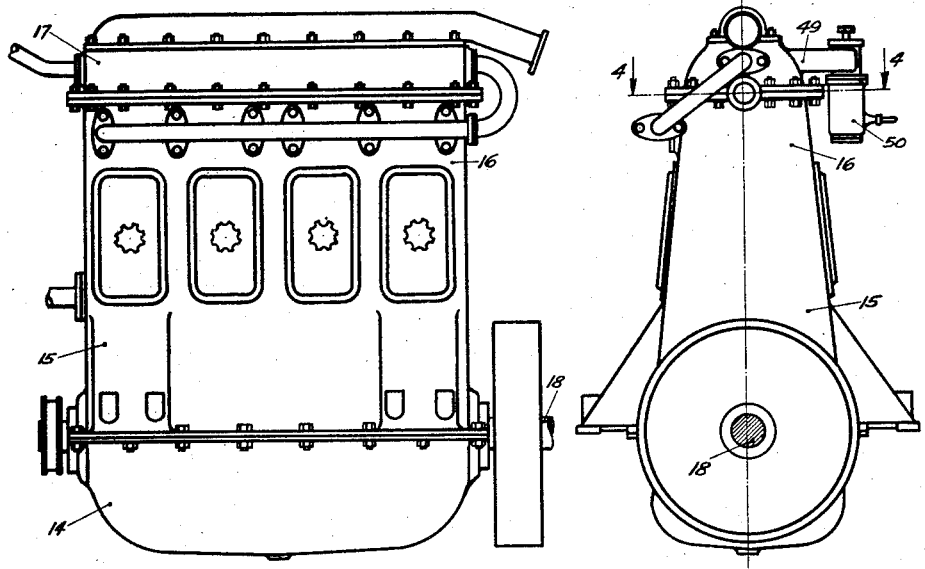
Fig. 2 is a rear end view of the engine.
Figure 4:
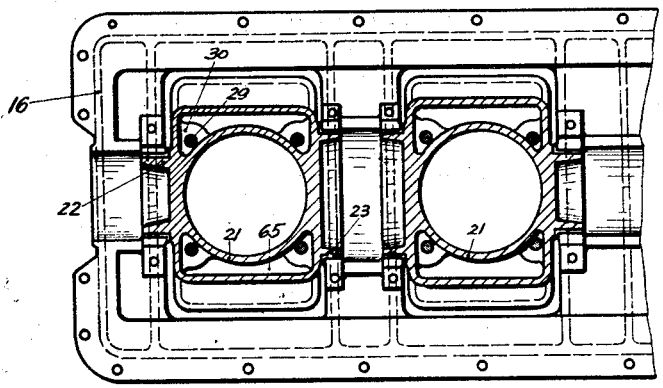
Fig. 4 is a detail sectional view taken on the line 4—4 of Fig. 2.

Referring to the drawings, the numeral 14 designates the lower half of the crank case, 15 the upper half of the crank case extending to form an entablature 16 upon which a fixed head 17 is supported and to which it is secured, the crank shaft 18 being journalled in the usual manner in bearings 19 on the upper half of the crank case and bearing caps 20 bolted thereto.

Each of the engine cylinders 21 is mounted for oscillation, preferably by providing each cylinder with oppositely disposed trunnions 22 and 23 suitably journalled in the fixed frame parts of the engine. As shown, each trunnion 22 is formed as an extension of the cylinder barrel journalled in a split bearing bushing 24 whose lower half is mounted in a semicylindrical recess 25 formed in the entablature or frame 16 and whose upper half is mounted within a bearing cap 26 secured at its ends by bolts or other suitable fastening means to said entablature.

The head 28 of each cylinder is secured to the cylinder barrel by studs 29 carried by the head, extending through and suitably clamped to bosses 30 on the cylinder barrel. Each trunnion 23 may be formed like the trunnion 22 or may be formed, as shown, partly by an extension of the cylinder barrel and partly by an extension 31 of the head, said parts being fitted to pivot in a split bearing bushing 32 whose lower half is mounted in a semicylindrical recess 33 in the entablature and whose upper half is mounted within a bearing cap 34 secured at its ends by bolts or other suitable fastening means to said entablature 16.

A piston 35 is mounted to reciprocate in each cylinder and is provided with a piston-rod 36 slidably mounted in a tubular extension 37 of the cylinder and having sealing rings 37' mounted on it and having a split bearing 38 journalled on a crank pin 39 of the crank shaft. To more efficiently transmit the thrust, each cylinder has a forked web extension 40 whose bifurcations 41 from guides for a cross-head formed by extensions 42 on the upper half of the bearing end of the piston-rod 36, as shown more particularly in Figs. 5 and 6.

With this construction it will be noted that as the crank shaft 18 is rotated the cylinders 21 will be oscillated by the movement of said shaft, the cylinders preferably being arranged in pairs with the crank throws of the crank shaft for each pair of cylinders at one hundred and eighty degrees apart so that for two cycle operation there are two power strokes to each revolution of the crank shaft for each pair of cylinders.

The fixed head 17 of the engine is provided with a cooling jacket space 43, exhaust ports 44, mixture inlet spaces 45 having ports 46, and an ignition chamber 47 having a port 47' for each cylinder of a pair. The exhaust ports 44 communicate with an exhaust conduit 48 secured to the head; the inlet spaces with a pipe or manifold 49 connected with the carburetor 50, and a sparking ignition plug 51 extends into each chamber 47.

Each cylinder head 31 is provided with spaced exhaust ports 52 adapted to register with the exhaust ports 44 and with a port 53 movable into register with the port 47' at the proper time in the cycle of the engine.

A semicylindrical oscillatory valve 54, whose axis coincides with the axis of oscillation of the cylinder, is interposed between the head 31 of each cylinder and the fixed head, said heads being curved to accurately conform to the curvature of the valve and sealing half rings 55 may be mounted in each cylinder head 31 and pressed by springs 56 against the end portions of each valve. Each valve has spaced exhaust ports 57 adapted to register with the exhaust ports 44 and 52, a port 58 adapted to register with the ports 53 and 47', and ports 59 adapted to register with the ports 46 at the proper time in the cycle of the engine.

Each valve 54 is intermittently oscillated by the movement of the cylinder associated therewith and for this purpose we provide projections 60 and 61 alternately engageable with the adjacent side edges of said valve. In order to prevent possibility of movement of the valve through frictional force of the moving cylinder, we provide restraining means, such as a holding member 62 pivoted to the frame at 63 and held against the valve by a spring 64.

Diametrically disposed mixture inlet passages 65 in each cylinder 21 lead to an annular space 66 at the back end of the cylinder communicating through a port 67' with the cylinder space at the back of the piston, each of said ports being controlled by a reciprocating piston valve 67 operated by an eccentric 68 formed as a part of the crank shaft and operatively connected to said valve by the eccentric strap 69 and rod 70. Ports 71 are formed in the cylinder communicating by transfer passages 72 with scavenge ports 73 uncovered by the piston as it nears the end of the exhaust stroke.

Figure 3:
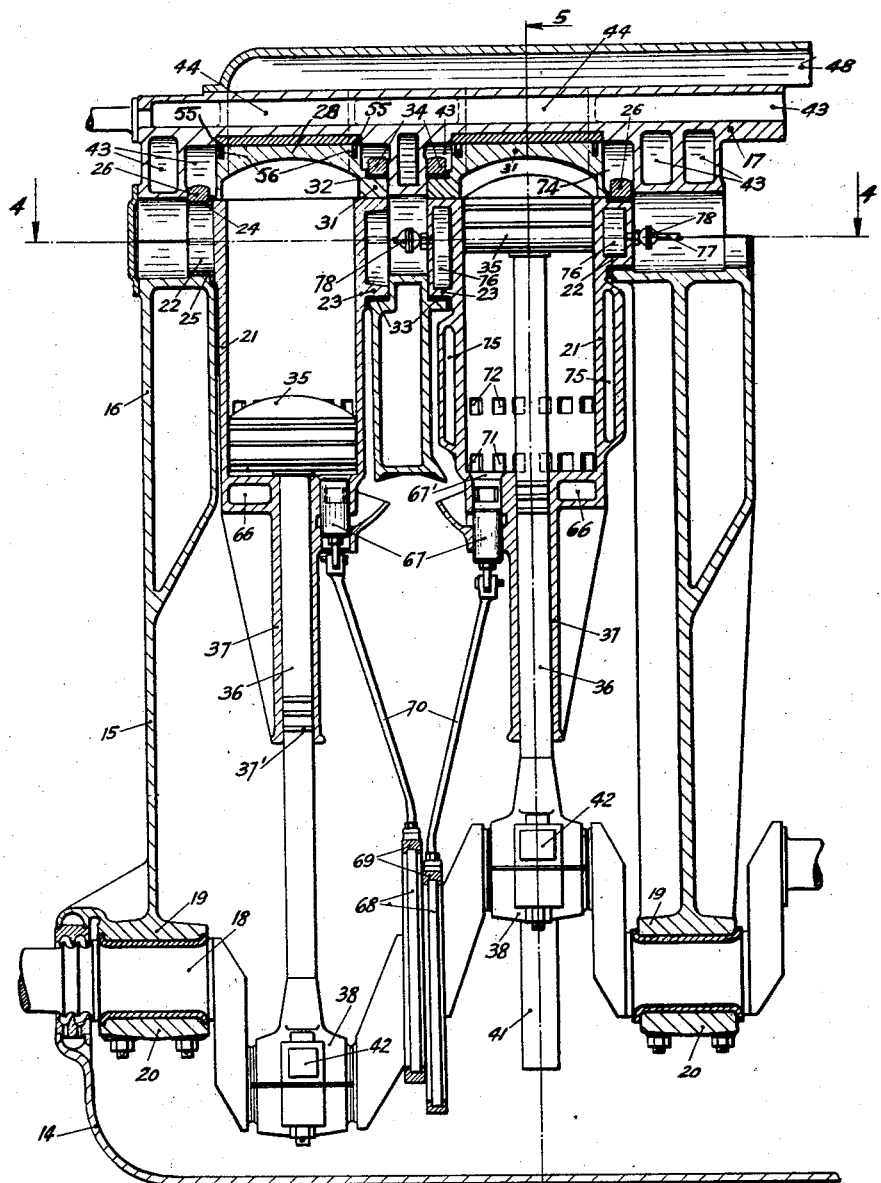
Fig. 3 is a vertical sectional view taken on the line 3—3 of Fig. 2, including certain modifications.

The registering exhaust ports 52, 57, as shown in Figs. 3, 5 and 13, are preferably relatively long and narrow, to secure a quick maximum port opening and permit of an efficient seal.

The cylinders 21 may be cooled by conduction from the cooled head and jacket spaces 74 formed in the frame, as shown in connection with the end cylinder of Fig. 3, but if desired or necessary each cylinder, as shown in connection with the inner cylinder of Fig. 3, may be provided with a jacket space 75 supplied with cooling liquid by suitable communication with a space 76 in each trunnion which is connected to a source of cooling liquid by pipes 77, including ball joints 78. The mixture inlet passages 65 are preferably arranged to receive heat from the cylinder wall so as to insure an efficient mixture.

Referring more particularly to Figs. 9 to 13, inclusive, the operation of the engine will now be explained. In Fig. 9 the piston 35 has completed its upward movement whereby a fresh charge has been drawn in behind it through the port 67', the valve 67 being open, and the charge in the combustion chamber has been compressed, at which time the exhaust ports are in a lapped or closed position, the ports 47', 58 and 53 are in alined or open position, establishing communication between the ignition chamber 47 and the combustion chamber and the piston valve 67 is nearing its closed position and the charge in said combustion chamber is being fired either by the spark plug 51 during starting or by heated products of combustion trapped in said chamber 47 during running, it being noted that this ignition chamber may be used for furnishing an igniting charge for more than one, preferably a pair of cylinders, and that but a single ignition plug is necessary for each ignition chamber. On ignition of the charge the piston moves downwardly in the cylinder under the action of the expanding gases, the valve 67 closing so that the next charge is being compressed in the space in back of the piston to the desired pressure and the cylinder oscillating toward the right thereby moving ports 53 and 52 toward the left and causing projection 60 to engage the valve 54, which up to about this time has remained stationary, and swing it to the left to bring ports 57 into register with ports 44 and move port 58 out of register with port 47', the parts then being in substantially the position shown in Fig. 10 when the piston has travelled through half its stroke. As the piston continues to move downwardly, further compressing the new charge, the cylinder oscillates from the position shown in Fig. 10 to that shown in Fig. 11, the valve 54 being then stationary, with the ignition chamber cut off and ports 52 coming into register with the ports 57 and 44 to allow the exhaust gases to escape at the time the piston has moved to uncover the ports 72, as shown in Fig. 11. At this time the compressed, new charge has passed from the space in back of the piston through ports 71 and transfer ports 72 and passage 73 into the cylinder, driving out the desired amount of residual gases and filling the cylinder with the new charge. As the piston starts on its compression stroke the cylinder 21 swings past its vertical position, shown in Fig. 11, to the left, as shown in Fig. 12, during which time the valve 67 is opened to permit the induction of a new charge behind the piston and the projection 61 has engaged the valve 54 to move it back to the initial position shown in Figs. 12 and 9, while the ignition chamber is still cut off by the lapped position of the port 53 and the exhaust is cut off by the lapped position of the ports 52 and 57. As the piston moves from the position shown in Fig. 12 to that shown in Fig. 9, compression of the charge is completed in front of it and induction of the new charge behind it while the cylinder swings back to vertical position, shown in Fig. 9, and the cycle is then repeated. The mixture inlet ports 46 and 59, while moving relatively to each other during the cycle of operations, are always in communication.

The preferred method of operating the engine is to retain a greater amount of the residual gases than usual and to use a relatively high pressure to provide the new charge, whereby the combustion process will be improved, since any of the unburned fuel in the first charge will be consumed in the following combustion period.

It will also be noted from the above that as soon as the engine becomes heated the ignition of the charge is automatic and since the cylinders are arranged in pairs with the pistons at one hundred and eighty degrees apart, this chamber will be alternately charged with burning gases from each cylinder, thereby insuring ignition of the charge in the other cylinder.

We desire it to be understood that this invention is not to be limited to any specific form or arrangement of parts except insofar as such limitations are included in the claims.

What we claim as our invention is:

1. In an internal combustion engine, the combination with the engine frame, of a cylinder mounted to oscillate on said frame, a piston working in said cylinder and operatively connected to the crank shaft, and valve mechanism including an oscillatory valve member intermittently actuated by the movement of the cylinder in its cycle.

2. In an internal combustion engine, the combination with a plurality of cylinders, pistons working in each cylinder, means for introducing the working medium into each cylinder, an ignition chamber for said cylinders, and means for bringing said ignition chamber into communication with each cylinder near or at the end of the compression stroke of the piston in that cylinder.

3. In an internal combustion engine, the combination of an oscillatory cylinder provided with a head having a port therein, and a slide-valve controlling said port and positively and intermittently actuated by the cylinder.

4. In an internal combustion engine, the combination of an oscillatory cylinder provided with a semicylindrical head having a medially disposed exhaust port, a semicylindrical slide-valve having a port to register with said first-named port, a fixed head having a port registering with said ports, a piston working in said cylinder, said cylinder having inlet ports uncovered by the piston at the end of its stroke, said port arrangement provided for the straight flow of gases out of and into the cylinder.

5. In an internal combustion engine, the combination of an oscillatory cylinder provided with a semicylindrical head having an exhaust port and an ignition port formed therein, a semicylindrical oscillatory valve having ports to register with said first-named ports, a fixed head having ports registerable with the above named ports, and provided with an ignition chamber, means for intermittently actuating said valve by the cylinder, a crank shaft, a piston working in said cylinder and operatively connected to said crank shaft, and means for introducing the charge into the cylinder.

6. In an internal combustion engine, the combination of an oscillatory cylinder provided with a semicylindrical head having an exhaust port and an ignition port formed therein, a semicylindrical oscillatory valve having ports to register with said first-named ports, a fixed head having ports registerable with the above named ports and provided with an ignition chamber, said cylinder having parts intermittently engageable with said valve to oscillate the same by the cylinder, a crank shaft, a piston working in said cylinder and operatively connected to said cylinder and crank shaft, and means for introducing the charge into the cylinder.

7. In an internal combustion engine, the combination of an oscillatory cylinder provided with a curved head whose center of curvature coincides with the center of oscillation of the cylinder, a semicylindrical valve of similar curvature, ports in said head and said valve, a fixed head having a port adapted to register with said first-named ports, said cylinder having projections engageable with said valve to intermittently oscillate the same, and means for otherwise restraining the movement of said valve.

8. In an internal combustion engine, the combination with the engine frame, of an engine cylinder mounted to oscillate in said frame, exhaust valve mechanism controlled by the oscillation of said cylinder and controlling the passage of gases from the upper end of the cylinder, a piston working in the cylinder, a compression space formed in the cylinder behind the piston, scavenge ports communicating with said space and uncovered by the piston at the end of its inner stroke, and a crank shaft operatively connected to said piston and cylinder for actuating the same.

9. In an internal combustion engine, the combination of a pair of adjacent cylinders and a chamber connecting said cylinders, of valve means for controlling the flow of hot gases successively from said cylinders to said chamber and for establishing communication between said chamber and one of said cylinders while closing communication between said chamber and the other cylinder whereby the hot gases of one cylinder are used for ignition of the compressed charge in the other cylinder.

10. In an internal combustion engine, the combination of a pair of adjacent cylinders and a chamber connecting said cylinder, of a valve for each cylinder controlling the flow of hot gases from its associated cylinder to said chamber, said valves being alternately operable to establish communication between said chamber and said cylinders, whereby the hot gases from one cylinder are used to ignite the compressed charge in the other cylinder, each valve also timing the ignition of the charge in the cylinder.

In testimony whereof, we affix our signatures.

LEO BERNER.
PAUL LOHR.